Jan. 7, 1964

L. J. HIERTA 3,116,678

VENTILATOR

Filed Nov. 14, 1960

LARS HIERTA
INVENTOR.

BY John P. Faulkner
John J. Roethel

ATTORNEYS

Jan. 7, 1964     L. J. HIERTA     3,116,678
VENTILATOR

Filed Nov. 14, 1960     2 Sheets-Sheet 2

LARS HIERTA
*INVENTOR.*

BY *John R. Faulkner*
*John J. Roethel*

*ATTORNEYS*

United States Patent Office 3,116,678
Patented Jan. 7, 1964

3,116,678
VENTILATOR
Lars J. Hierta, Garden City, Mich., assignor to Ford Motor Company, Dearborn, Mich., a corporation of Delaware
Filed Nov. 14, 1960, Ser. No. 69,134
3 Claims. (Cl. 98—2)

This invention relates to ventilators and more particularly to ventilators used in connection with motor vehicle bodies.

In a common form of vehicular heating or air conditioning system the air flow through the ventilator duct is regulated by a pivotally supported closure member or door interposed in the line of air flow. The duct area and, accordingly, the quantity of air passing through the duct is regulated by changing the position of the door. Conventionally, these doors are pivotally supported directly on the ventilator frame or, in some cases, the door is rigidly secured to a pivotally mounted supporting member. In the closed position these doors are designed to seat in coplanar relation to the marginal portion of the ventilator frame outlet opening. Frequently, however, the marginal surface of the frame and the mating surface of the closure member do not coincide in the closed position and, in the extreme cases often encountered, the use of a gasket or other sealing means between these surfaces fails to eliminate undesirable air leakage.

It is an object of the present invention to provide an improved means for supporting the ventilator door for movement to regulate the air flow. The improved support is constructed in such a manner that the closure member is free to move to seek a coplanar relationship with the marginal portion of the ventilator frame outlet when in the closed position, thereby compensating for planar irregularities between the mating surfaces.

Further objects and advantages of this invention will become more obvious as this description proceeds, particularly where considered in connection with the accompanying drawings in which.

Figure 1:
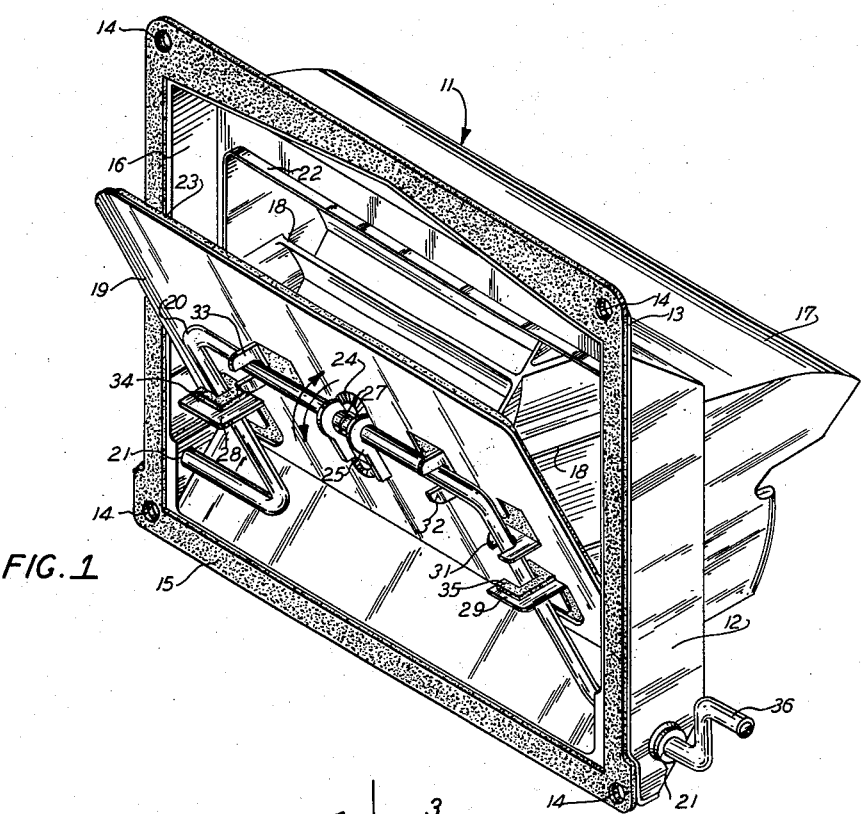
FIGURE 1 is a perspective view of the ventilator showing the closure member in a partially open position.
Figure 2:
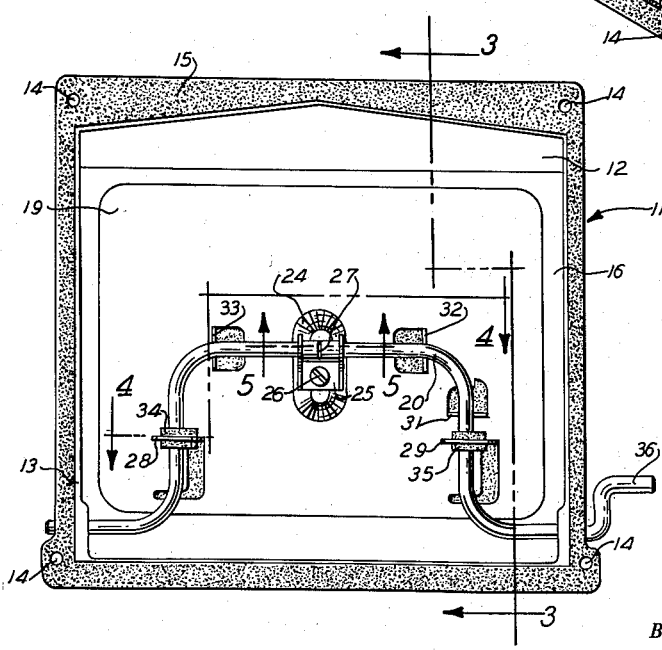
FIGURE 2 is a front elevational view of the ventilator with the closure member shown in the closed position.
Figure 3:
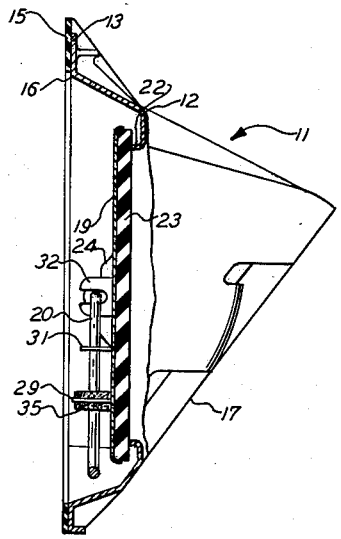
FIGURE 3 is a cross sectional view taken along line 3—3 of FIGURE 2.
Figure 4:
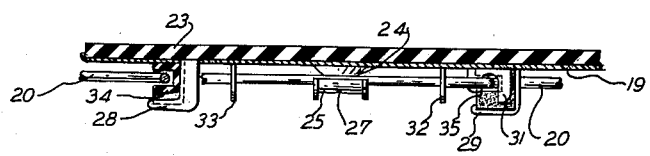
FIGURE 4 is a cross sectional view taken along line 4—4 of FIGURE 2.

Referring now to the drawings, there is shown generally at 11 a ventilator assembly suitable for use in an air flow system and particularly suited for use in motor vehicle heating and air conditioning ventilator systems. The ventilator assembly 11 includes a ventilator register frame 12, formed preferably of a one piece casting, having a mounting flange portion 13. The ventilator frame 12 may be secured to the heater or air conditioning system by bolts (not shown) which pass through the holes 14 provided in flange portion 13. An air seal is provided between the ventilator frame and the adjacent supporting surface by a resilient gasket 15. Air enters the ventilator register through the enlarged inlet portion 16 and passes out through the outlet duct portion 17. The outlet duct portion 17 is louvered, as at 18, to direct and disperse the exhaust air flow.

Flow of the air through register 12 is regulated by a closure member or door 19 supported for movement by the crank-shaped member 20. Member 20 is, in turn, supported for pivotal movement relative to frame 12 contiguous to its end portions by bushings 21 formed in frame member 12. In the closed position of door 19 the surface opposite to that side of door 19 to which member 20 is secured would, ideally, move into coplanar relationship with the surface of the marginal portion or coaming 22 of the outlet duct opening. A layer of resilient material 23 is provided in this area to provide an air tight seal when the door 19 is closed. This resilient gasket will compensate for minor surface irregularities of marginal edge 22.

Figure 5:
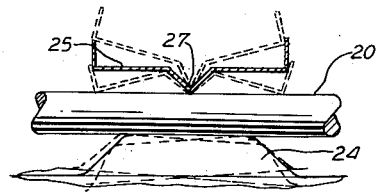
FIGURE 5 is an enlarged cross sectional view taken along line 5—5 of FIGURE 2.

Due to manufacturing irregularities, the plane of the marginal edge 22 and that of the mating surface of door 19 frequently do not coincide when the door is in the closed position. The resilient gasket 23 often cannot sufficiently compensate for these planar misalignments. To compensate for these misalignments the connection, now to be described, between member 20 and door 19 is such that the door 19 may tilt or move to seek a position in which it will form an air tight seal with the marginal portional 22 of frame 12. Door 19 is formed, at its central portion, with an embossed portion 24 to which a clip 25 is secured, as by the screw 26. A C-shaped section of clip 25 encircles the support member 20. As may be seen from FIGURE 5, clip 25 is formed with an indented portion 27. This portion is the only part of clip 25 that actually contacts support member 20. Although clip 25 connects member 20 to door 19, the door may tilt relative to member 19 about the indented portion 27 of clip 25. The dotted line views of FIGURE 5 show the limits of this movement. Door 19 is also free to swing about member 20 in the direction of the arrows shown in FIGURE 1. The freedom allowed between door 19 and member 20 is such that door 19 may move to the position in which it best mates with surface 22.

To prevent excessive movement of the door 19 relative to member 20, when in its open position, the door is formed with upturned tabs 28, 29, 31, 32 and 33. Tabs 28, 29, 31, 32 and 33 are formed with slots therein through which member 20 passes. These slots are wider than member 20 to provide clearance for a limited amount of relative movement therebetween. Tabs 28, 29, 31, 32 and 33, however, because of their location and configuration limit the amount of relative motion between the door 19 and support member 23 in all directions. If desired, one or more of these tabs may be provided with resilient inserts to eliminate the wear and noise that would occur from a metal to metal contact. Tabs 28 and 29 are shown as having such inserts, 34 and 35, respectively.

In the illustrated embodiment member 20, as well as serving as a support for door 19, also acts as the operating member for door 19. This is accomplished by forming one end of member 23 as a crank arm 36. Actuation of crank arm 36 is accomplished in any known manner. For example, crank arm 36 may be connected to be operated by a Bowden wire actuator (not shown). Rotation of crank arm 36 causes member 20 to pivot in frame 12 and, in turn, causes pivotal movement of the door 19 from the open to closed positions. The force exerted on door 19 is, of course, transmitted through the point of connection between door 19 and member 20. This gives door 19 self-equalizing characteristics. That is, it may tilt to assume the position in which it conforms to the plane of the mating portion 22 of ventilator frame 12. An air tight seal between these elements, regardless of any planar irregularities that may exist between their surfaces, is thus provided. Door 19 is also free, because of its connection to member 20, to assume a different position relative to frame 12 each time it is closed. Thus, it has no memory of former positions which it may have occupied.

It will be understood that the invention is not to be limited to the exact construction described, but that various changes and modifications may be made without de-

I claim:

1. A ventilator assembly including a frame having an opening surrounded by a coaming having a sealing surface, a closure member for said opening having a marginal portion engageable with said sealing surface of said coaming, a crank shaped member pivotally supported on said frame for swinging movement about a pivot axis contiguous and parallel to one edge of said frame opening, said crank shaped member having a portion extending across said frame opening in parallel offset relationship to said pivot axis, and connective means journaling said closure member on said crank shaped member portion for limited swivelling movement about a pivot axis located intermediate the ends of the latter, said closure member being bodily swingable with said crank shaped member between opened and closed position relative to said frame opening, and, upon being swung toward a closed position, said closure member upon engagement of any part of its marginal portion with a part of said coaming swivelling about said last mentioned pivot axis to bring its entire marginal portion into sealing contact with the entire sealing surface of said coaming.

2. A ventilator assembly including a frame having an opening therein, said opening having a marginal edge portion defining a sealing plane, a closure member for said opening having a sealing portion defining a sealing plane, a crank member, means supporting said crank member at the terminal portion thereof for pivotal movement on said frame about a pivot axis contiguous and parallel to one edge of said opening, said crank member having an intermediate portion extending across substantially the center of said opening in parallel offset relationship to said pivot axis, and coupling means journaling said closure member upon said crank member, said coupling means including means on said closure member coacting with said crank member portion intermediate the ends of the latter to define a pivot axis about which said closure member has limited swivelling movement relaitve to said crank member, said closure member being bodily swingable with said crank shaped member between opened and closed positions relative to said opening to bring said closure member sealing portion into sealing engagement with the marginal edge portion of said opening, said closure member upon engagement of any part of its sealing portion with a part of said marginal edge portion being adapted to swivel about said last mentioned pivot axis to bring its sealing plane into coplanar relationship with the sealing plane of said marginal edge portion thereby compensating for any planar misalignment therebetween.

3. A ventilator assembly including a frame having an opening therein, said opening having a marginal edge portion defining a sealing plane, a closure member for said opening having a sealing portion defining a sealing plane, an actuating member for said closure member adapted to swing the latter between opened and closed positions, an embossed portion upon said closure member located substantially at the center thereof, and clip means secured to said closure member at said embossed portion and encompassing a portion of said actuating member interposed between said clip means and said embossed portion, the construction and arrangement of said clip means, actuating member portion and embossed portion permitting limited swivelling movement of said closure member about a pivot axis located substantially at the center of said closure member, said actuating member being operable to bodily swing said closure member from opened to closed position to bring said closure member sealing portion into engagement with said marginal edge portion, said closure member upon engagement of any part of its sealing portion with a part of said marginal edge portion being adapted to swivel relative to said actuating member to bring its sealing plane into coplanar relationship with the sealing plane of said marginal edge portion.

References Cited in the file of this patent

UNITED STATES PATENTS

| 509,332 | Smith | Nov. 21, 1893 |
|---|---|---|
| 1,654,715 | Affleck et al. | Jan. 3, 1928 |
| 2,158,245 | Moore | May 16, 1939 |
| 2,655,093 | Broberg | Oct. 13, 1953 |
| 2,699,106 | Hoyer | Jan. 11, 1955 |